No. 714,026. Patented Nov. 18, 1902.
B. S. PERKINS.
TEA MEASURE.
Application filed May 24, 1901.

(No Model.) 3 Sheets—Sheet 1.

WITNESSES
INVENTOR
Berton S. Perkins
BY
ATTORNEYS

No. 714,026. Patented Nov. 18, 1902.
B. S. PERKINS.
TEA MEASURE.
(Application filed May 24, 1901.)
(No Model.) 3 Sheets—Sheet 2.
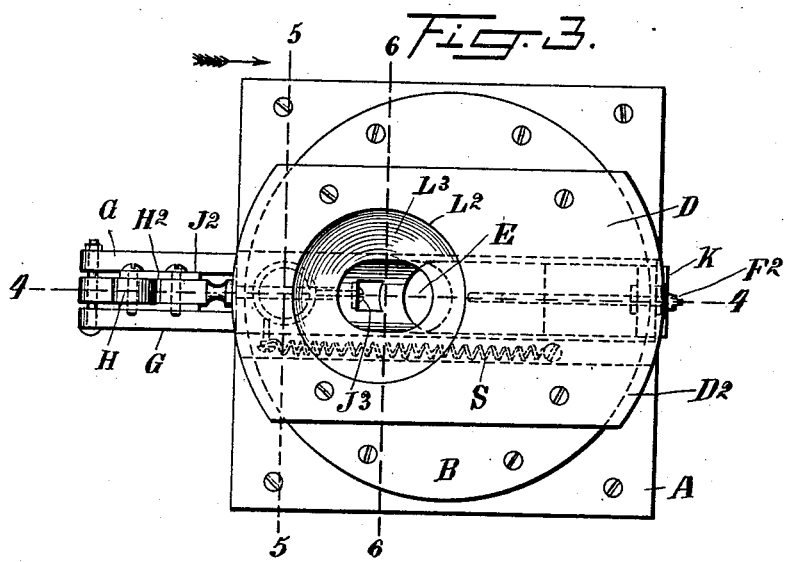
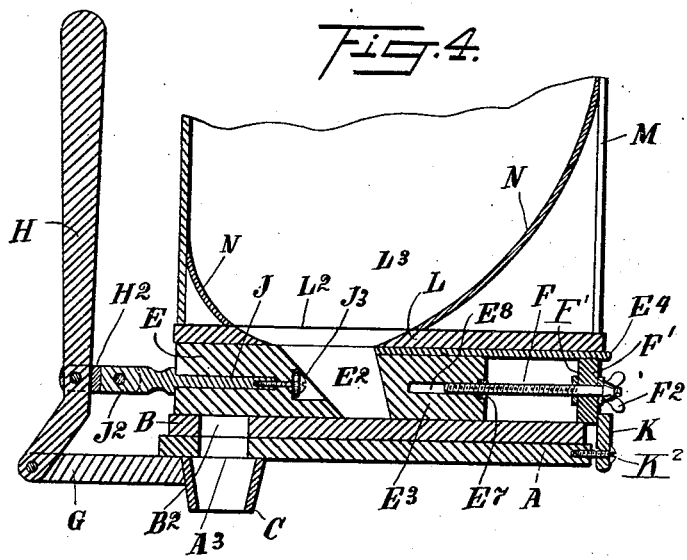
WITNESSES
INVENTOR
BY
ATTORNEYS No. 714,026. Patented Nov. 18, 1902.
B. S. PERKINS.
TEA MEASURE.
(Application filed May 24, 1901.)

(No Model.) 3 Sheets—Sheet 3.

WITNESSES
F. W. Stewart
F. F. Leller

INVENTOR
Berton S. Perkins
BY
Edgar Tate
ATTORNEYS

UNITED STATES PATENT OFFICE.

BERTON S. PERKINS, OF NEW YORK, N. Y., ASSIGNOR OF ONE-HALF TO PATRICK J. BAKER, OF NEW YORK, N. Y.

TEA-MEASURE.

SPECIFICATION forming part of Letters Patent No. 714,026, dated November 18, 1902.

Application filed May 24, 1901. Serial No. 61,695. (No model.)

*To all whom it may concern:*

Be it known that I, BERTON S. PERKINS, a citizen of the United States, residing at New York, in the county of New York and State of New York, have invented certain new and useful Improvements in Tea-Measures, of which the following is a full and complete specification, such as will enable those skilled in the art to which it appertains to make and use the same.

This invention relates particularly to means for measuring out portions of tea.

It is especially adapted for use in restaurants, hotels, or boarding-houses, in which certain specific portions of tea are constantly desired to be withdrawn from a receptacle, so as to make separate pots of tea.

The object of my invention is to provide a simple, cheap, readily-constructed, and perfectly-operating device of this character by means whereof such specific portions of tea may instantly be withdrawn by a single movement and may accurately be measured out, so as to withdraw absolute uniform quantities at each operation, a further object of the invention being to provide such a device as will permit the unit quantity to be increased or diminished in amount.

With these and other objects in view my invention consists of the novel construction and arrangement of parts hereinafter described and claimed.

Figure 1:
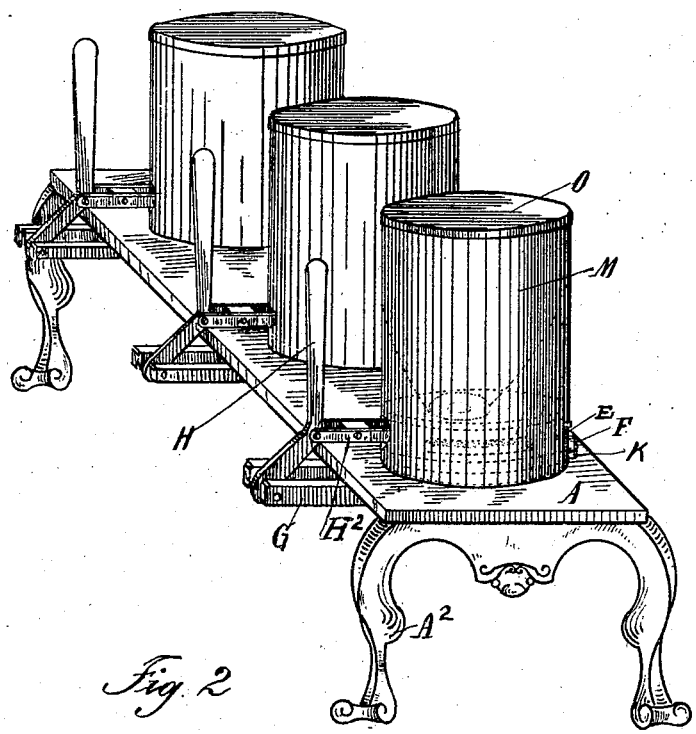
Figure 2:
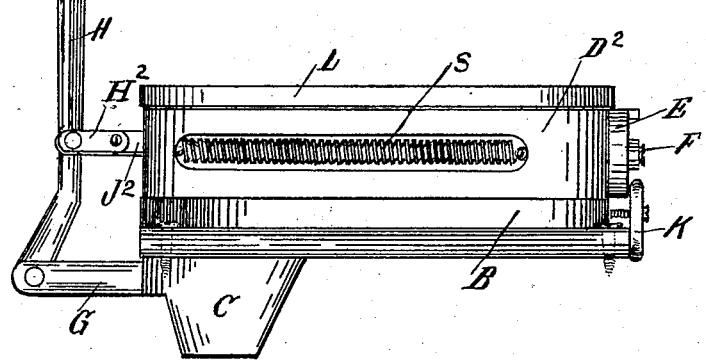
Figure 5:
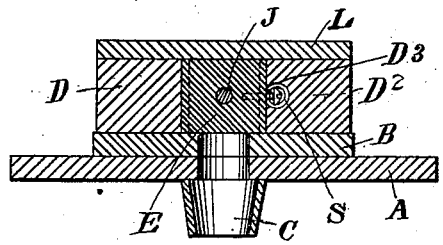
Figure 6:
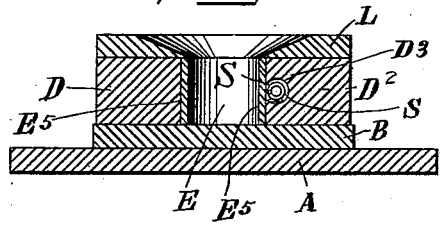
Figure 7:
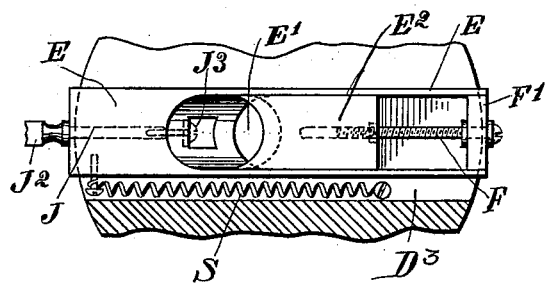

In the accompanying drawings, forming part of this specification, in which like letters of reference designate corresponding parts in the several views, Figure 1 is a perspective view of a device embodying my invention as it appears ready for use. Fig. 2 is a side elevation of a single one of the measuring devices with the main tea-receptacle removed. Fig. 3 is a plan view of the device shown in Fig. 2 with the base or cover removed. Fig. 4 is a central vertical section of one of the complete devices, the upper portion being broken away. Fig. 5 is a transverse vertical section on the line 5 5 of Fig. 3. Fig. 6 is a similar section on the line 6 6 of Fig. 3, and Fig. 7 is a plan view of the central portion of the device with the casing of the spring removed.

In the practice of my invention, as shown in the drawings, I provide a table A, mounted upon suitable standards, legs, or supports $A^2$, and this table may be of any desired size or length, and in Fig. 1 I have shown the same of a length to accommodate three separate measuring devices; but in the other figures I have not continued the table beyond the length necessary for a single measuring device. Upon this table I mount one or a plurality of disks or plates B, according to the length of the table, and said disks or plates are rigidly secured to said table and provided near the front edge of the table with an aperture $B^2$, and the table A is provided directly under the aperture $B^2$ with a corresponding aperture $A^3$, and secured to the table A is a nozzle or discharge-spout C.

Across the disk B and transversely of the table I secure blocks D and $D^2$, forming guides for a reciprocating slide-box E, which is placed between said blocks, and formed in the inner side of the block $D^2$ is a longitudinal recess $D^3$, in which is placed a spring S, secured at its forward end to the slide-box E and at its opposite end to the said block or guide $D^2$, and the function of this spring is to retract the slide-box and maintain it normally in the position shown in Fig. 4.

Secured to the bottom of the front edge of the table and projecting forwardly therefrom are two supports or bearing-lugs G, which are arranged in transverse line with the nozzle C. Pivoted between the outer ends of these supports or bearing-lugs is a lever H, which is connected, by means of links $H^2$, with the head $J^2$ of a rod or plate J, which is secured to the slide-box E and held in position by a screw-nut or similar device $J^3$. The slide-box E comprises a front portion and rear portion $E^3$, between which is a conical opening $E^2$, extending therethrough and forming a measuring chamber or recess and which in the normal position of the parts shown in Fig. 4 lies rearwardly of the apertures $B^2$ and $A^2$ and the nozzle or spout C, but may be drawn into alinement therewith by moving the lever H outwardly, thereby projecting the slide-box E. The rear wall of the opening or measuring-chamber $E^2$ of the slide-box E is formed by the rear portion $E^3$ of said slide-box, consisting of an adjustable block which is movable and provided with a top plate E⁴ and which fits between side plates E⁵, connected with the front portion of said slide-box, and the rear portion or adjustable block of the slide-box E is operated by a screw F, mounted and free to turn in the rear end plate or support F', connected with the side plates E⁵ of the slide-box E, and the outer end of which is provided with a head or thumb piece F² and the inner end of which passes through a nut E⁷ in the rear end of the block E³ and into the screw-threaded bore or suitable opening E⁸ in the said block, and by turning the screw F the block E³ or the rear movable portion of the slide-box E formed thereby may be adjusted, as will be readily understood, so as to increase or decrease the size or capacity of the opening or measuring-chamber E² in the slide-box, and the rearward movement of the slide-box is limited by a stop K, secured to the table A by a screw K² and projecting upwardly from the table A at the rear edge thereof.

On top of the blocks or guides D and D² is secured a plate or base L, provided with an aperture L² above and substantially in alinement with the aperture E² in the slide-box when the latter is in its normal position, as shown in Fig. 4, and said plate or base is tapered or formed with a beveled annular edge L³ around said aperture, and above the plate or base L is mounted a receptacle M, preferably cylindrical in form, and the lower portion of which projects downwardly and rests upon the table A, the front and back portions thereof being cut out at the bottom to permit of the operation of the movable parts of the device, and within the receptacle M are placed inclined partitions N, which project from the front and rear walls inwardly to the beveled portion L³ of the plate or base L, so as to form a hopper to discharge the contents of the receptacle into the slide-box, and the side portions of said receptacle may also be provided with inclined partitions for a similar purpose.

The operation of the device will be readily understood from the foregoing description when taken in connection with the accompanying drawings and the following statement thereof, and the advantages of my improvement will be manifest to all who are familiar with devices of this character. The casing or receptacle M being filled with tea or other articles of this class which it is desired to measure and it being desired to withdraw a certain portion therefrom, the teapot or other vessel is held beneath the nozzle or spout C and the lever H drawn forwardly. The tea normally descends through the hopper portion of the receptacle, with the aperture L², into the aperture or measuring-chamber E² of the slide-box E, where in the normal position of such box it is held by the disk or plate D. As the slide-box is drawn forwardly by the lever H it is moved out of alinement with the aperture L² and over and into alinement with the aperture B² in the plate B above the discharge-spout, thus simultaneously shutting off or closing the communication between the receptacle M and the slide-box and opening the discharge from the slide-box through the spout C, it being understood that while this result is produced by one operation of the lever H communication between the receptacle M and the slide-box is cut off before the communication between the slide-box and the discharge-spout C is established. Upon releasing the lever H the spring F retracts the slide-box to its normal position, the rearward movement being limited by the stop K, and it will be apparent that this operation may be repeated as often and as rapidly as desired.

It will also be understood that the capacity of the aperture or measuring-chamber E² in the slide-box may be regulated as desired by means of the screw F, and any desired amount of tea or other material may thus be discharged from the slide-box at each operation of the lever H.

My invention is not limited to the exact form, construction, and arrangement of the various parts or details thereof as herein shown and described, and I reserve the right to make all such alterations therein as fairly come within the scope of my invention.

Having thus fully described my invention, what I claim as new, and desire to secure by Letters Patent, is—

1. A measuring device of the character described comprising a table, a disk or plate mounted thereon and both apertured in alinement near the front edge of the table, a discharge-spout beneath the same, an operating-lever mounted in proximity to the discharge-spout and in front of the table, guide-blocks secured upon the disk, a slide-box mounted between said blocks, a spring placed in one of said blocks and connected therewith and with the slide-box and adapted to hold said box in its normal position, said box being provided with an aperture which serves as a measuring-chamber, and which is normally out of alinement with the discharge-spout, the aperture or measuring-chamber in said box being adjustable, and a receptacle mounted upon and inclosing that portion of the device above the table, said receptacle being adapted to serve as a hopper and to discharge the contents thereof into the slide-box, said lever being in operative connection therewith, substantially as shown and described.

2. A measuring device of the character described, comprising a table, a disk or plate mounted thereon and both apertured in alinement near the forward edge thereof, a discharge-spout beneath the same, an operating-lever mounted in proximity to the discharge-spout, blocks secured upon the disk, a slide-box mounted between the said blocks and engaging the slide-box, a spring mounted adjacent the said slide-box to normally retract the same, said box being provided with an aperture extending therethrough and normally out of alinement with the discharge-spout, an adjustable portion comprised in said box and forming a rear wall for its aperture and adapted to be forwardly or rearwardly moved, and being interiorly grooved in the rear thereof, means for increasing or diminishing the size of the aperture, a stop mounted upon the table and projecting upwardly and rearwardly of the said box, a cylinder or main receptacle mounted upon and incasing the device above the table, a base portion therefor, apertured in alinement with the aperture of the slide-box and beveled thereabove, a hopper portion within the said cylinder, extending from the walls thereof to the beveled aperture, and devices pivotally connected to the slide-box and to the operating-lever, whereby the said box may be actuated.

3. A measuring device of the character described, comprising a table, a disk or plate mounted thereon and both apertured in alinement near the forward edge thereof, a discharge-spout beneath the same, bearings projecting forwardly from the table, a vertically-disposed lever pivoted in said bearings, blocks secured upon the disk, a slide-box mounted between the said blocks and engaging the slide-box, a spring mounted in one of said blocks to normally retract the same, said box being provided with an aperture extending therethrough and normally out of alinement with the discharge-spout, an adjustable portion comprised in said box and forming a rear wall for its aperture and adapted to be forwardly or rearwardly moved, and being interiorly grooved in the rear thereof, a screw mounted in said slide-box and engaging the adjustable portion thereof, whereby to increase or diminish the size of the aperture, a stop mounted upon the table and projecting upwardly and rearwardly of the said box, a cylinder or main receptacle mounted upon and incasing the device above the table, a base portion therefor, apertured in alinement with the aperture of the slide-box and beveled thereabove, a hopper portion within the said cylinder, extending from the walls thereof to the beveled aperture, and links pivotally connected to the slide-box and to the operating-lever, whereby the said box may be actuated.

In testimony that I claim the foregoing as my invention I have signed my name, in presence of the subscribing witnesses, this 17th day of May, 1901.

BERTON S. PERKINS.

Witnesses:
F. A. STEWART,
F. F. TELLER.